United States Patent [19]
Gadkaree et al.

[11] Patent Number: 5,426,714
[45] Date of Patent: Jun. 20, 1995

[54] OPTICAL FIBER COUPLERS PACKAGED FOR RESISTANCE TO BENDING OR BREAKAGE, AND METHODS OF MAKING THE SAME

[75] Inventors: Kishor P. Gadkaree, Big Flats, N.Y.; Rengan Kannabiran, Wayland, Mass.; Joseph F. Mach, Lindley, N.Y.

[73] Assignee: Corning Incorporated, Corning, N.Y.

[21] Appl. No.: 249,816

[22] Filed: May 26, 1994

Related U.S. Application Data

[62] Division of Ser. No. 825,960, Jan. 27, 1992, abandoned.

[51] Int. Cl.[6] .......................... G02B 1/04; G02B 6/24
[52] U.S. Cl. ........................................ 385/39; 385/42; 385/43; 385/51; 385/141
[58] Field of Search .................. 385/39, 42, 43, 46, 385/48, 50, 51, 99, 141

[56] References Cited

U.S. PATENT DOCUMENTS

| | | | |
|---|---|---|---|
| 3,054,769 | 9/1962 | Pike | 523/210 |
| 3,568,012 | 3/1971 | Ernst et al. | 257/786 |
| 4,358,552 | 11/1982 | Shinohara et al. | 523/443 |
| 4,482,203 | 11/1984 | Stowe et al. | 385/30 |
| 4,668,719 | 5/1987 | Kato et al. | 523/458 |
| 4,707,069 | 11/1987 | Hoffman, III | 385/99 |
| 4,740,538 | 4/1988 | Sekutowski | 523/205 |
| 4,762,869 | 8/1988 | Heinz et al. | 524/59 |
| 4,902,324 | 2/1990 | Miller et al. | 65/407 |
| 4,906,068 | 3/1990 | Olson et al. | 385/43 |
| 4,931,076 | 6/1990 | Berkey | 65/402 |
| 4,943,130 | 7/1990 | Dannoux et al. | 385/14 |
| 4,948,217 | 8/1990 | Keck et al. | 385/24 |
| 5,091,989 | 2/1992 | Dannoux | 385/70 |
| 5,129,019 | 7/1992 | Robberg et al. | 385/42 |
| 5,131,735 | 7/1992 | Berkey et al. | 385/43 |
| 5,243,680 | 9/1993 | Soane | 385/42 X |
| 5,251,277 | 10/1993 | Young, Jr. | 385/43 |
| 5,268,979 | 12/1993 | Weidman | 385/42 |
| 5,293,440 | 3/1994 | Miles et al. | 385/51 |
| 5,295,210 | 3/1994 | Nolan et al. | 385/43 |

FOREIGN PATENT DOCUMENTS

| | | |
|---|---|---|
| 0169073 | 1/1986 | European Pat. Off. |
| 7245451T | 5/1969 | Japan |
| 8253984E | 11/1980 | Japan |
| 01-182810 | 7/1989 | Japan |
| 1-315430 | 12/1989 | Japan |
| 03-045911 | 2/1991 | Japan |
| 0098761 | 8/1961 | Netherlands |

OTHER PUBLICATIONS

T. Bricheno, et al., "Stable Low-Loss Single-Mode Couplers," *Electronics Letters*, vol. 20, No. 6 (Mar. 1984), pp. 230–232.

J. D. Bolt, "Ceramic Fiber-Fluoropolymer Composites for Electro Packaging Materials," *Materials Research Society Symposium Proceedings*, vol. 155, pp. 149–154 (1989).

B. S. Kawasaki, et al., "Biconical-Taper Single-Mode Fiber Coupler," *Optical Society of America* (Jul. 1981), *Optics Letters*, vol. 6, No. 7, pp. 327–328.

B. S. Kawasaki, et al., "A Single-Mode-Fiber Coupler with a Variale Coupling Ratio," *Journal of Lightwave Technology*, vol. LT-1, Jan. 1983, pp. 176–178.

*Primary Examiner*—John D. Lee
*Attorney, Agent, or Firm*—Michael L. Goldman; Jay M. Brown

[57] ABSTRACT

A rigid, low expansion formable housing composition can be used to package optical waveguide couplers. The housing is in intimate contact with and strongly bonded to the coupler being packaged. The housing composition includes a formable polymeric resin, a glass-ceramic or ceramic or glass filler, and, optionally, strengthening fibers. The filler has a low thermal expansion to compensate for the high expansion of the resin. A moisture barrier layer may be placed around the housing composition, and it is possible to incorporate a shock absorbing material between the housing and the moisture barrier layer.

19 Claims, 1 Drawing Sheet

OPTICAL FIBER COUPLERS PACKAGED FOR RESISTANCE TO BENDING OR BREAKAGE, AND METHODS OF MAKING THE SAME

CROSS-REFERENCE TO RELATED APPLICATION

This application is a divisional application based on U.S. application Ser. No. 07/825,960, filed on Jan. 27, 1992 (abandoned).

FIELD OF THE INVENTION

The present invention relates to a packaging composition for optical waveguide couplers.

BACKGROUND OF THE INVENTION

Optical waveguide couplers of various constructions are well known and in widespread use, especially in the telecommunications field. Generally, such optical waveguide couplers make it possible to interconnect individual optical waveguides so that the modulated light propagating through an input optical waveguide leading to the optical waveguide coupler continues to propagate through at least one output optical waveguide leading from the optical waveguide coupler. In some optical waveguide couplers, at least two input optical waveguides are fused together within the optical waveguide coupler so that the output light signal is a combination of the input light signals. Examples of optical waveguide couplers are disclosed by U.S. Pat. No. 4,902,324 to Miller et al., U.S. Pat. No. 4,931,076 to Berkey, U.S. Pat. No. 4,948,217 to Keck et al., and U.S. Pat. No. 4,943,130 to Dannoux et al.

Optical waveguide couplers perform quite well. However, they are sensitive to adverse environmental effects. For instance, problems can result from the coupling region of the optical fibers usually being bare (i.e. not provided with a jacket). In addition, optical waveguides are susceptible to bending or breakage where they are connected to couplers. As a result, any significant movement of one end of the coupler with respect to the other end results in an order of magnitude change in performance. The couplers thus have to be packaged in a strong, stiff material which prevents such movement and allows the coupler to be handled and installed in normal environmental conditions without substantial performance degradation.

There are many strong, stiff materials which have been utilized to package optical waveguide couplers, including metals and polymer compositions. For example, optical waveguide couplers have been packaged in a housing made from polycarbonate or other engineering plastics. Such packaging permits easier handling, provides protection against mechanical shock-like vibrations, and imparts environmental protection against temperature and humidity variations.

U.S. patent application Ser. No. 593,903, entitled "Method For Encapsulating an Optical Component and the Encapsulated Component Obtained Thereby" to Dannoux couples optical waveguides with a bar of glass encapsulated by a casing. Free space between the bar and the casing is filled with a sealing composition (e.g., epoxy resin or solder).

U.S. Pat. No. 4,707,069 to Hoffman III relates to an optical waveguide coupler with a V-shaped cross-section bounding an open channel for the fiber. The V-shape is formed by a metal support having a coefficient of thermal expansion approximately equal to that of the optical waveguide. Within the coupler, the optical waveguide's coating has been removed, and the fibers are held in place with an adhesive.

U.S. Pat. No. 4,906,068 to Olson et al. relates to an optical waveguide coupler with a housing made of quartz glass.

Japanese Published Patent Application No. 03-045911 discloses a housing for a branched coupler of optical waveguides produced from a composition of an anisotropic polymer resin and a fibrous filler with a low coefficient of thermal expansion. The filler is produced from carbon fibers or organic high molecular weight fibers. The resulting composition has a coefficient of thermal expansion of about $1 \times 10^{-6}$ $C.^{-1}$. Injection molding is used to form the housing around the coupler; however, injection molding is a high temperature operation which can damage optical fibers connected by the coupler. Further, such molding operations tend to shorten the carbon or organic fibers in the housing composition to lengths that are too short to impart strength to the coupler along a substantial part of its length (e.g., 0.18 cm or less).

U.S. Pat. No. 4,482,203 to Stowe et al. discloses an optical waveguide coupler in which waveguide coatings have been removed. The coupler housing is filled with RTV vulcanizing silicones or other filler materials, such as epoxy resins.

Japanese Published Patent Application No. 01-182810 relates to an optical waveguide coupler surrounded by a base plate and box made of plastic.

B. S. Kawasaki, K. O. Hill, and R. G. Lamont, "Biconical-Taper Single-Mode Fiber Coupler," *Optical Society of America* (1981), B. S. Kawasaki, M. Kawachi, K. O. Hill, and D. C. Johnson, "A Single-Mode-Fiber Coupler With a Variable Coupling Ratio," *Journal of Lightwave Technology, vol. LT-1*, and T. Bricheno and A. Fielding, "Stable Low-Loss Single-Mode Couplers," *Electronics Letters, vol. 20, no. 6* (1984) relate to couplers for optical waveguides in which the coupler is potted with a silicone, epoxy, or gel.

The housing materials disclosed by these references, however, suffer from a number of serious deficiencies.

One problem is that many housings are pre-formed as a rigid tube or an appropriately shaped box into which the coupler is forced. Such force fitting often causes breakage of the coupler or the optical waveguides. Even if no breakage occurs, the coupler or the optical waveguide may be bent resulting in the deleterious impact noted above.

Another problem with prior art coupler housings is that coefficients of thermal expansion of materials in contact with the coupler are not properly matched with that of the coupler material. Where the mismatch is significant, thermal stresses resulting from temperature fluctuations may cause bending of the coupler. This can result in optical property changes or, in extreme cases, breakage of the coupler.

In view of the above-noted problems with packaged optical waveguides, there remains a need for improved packaging systems of this type.

SUMMARY OF THE INVENTION

The present invention relates to a rigid, low expansion, formable composition which is suitable for use in optical packaging, particularly as a protective housing for optical waveguide couplers. The composition includes a formable polymeric resin, a glass-ceramic or ceramic or glass filler, and, optionally, inorganic or organic fibers. The resin preferably has a glass transition temperature of greater than 80° C., more preferably above 100° C. The filler has a coefficient of thermal expansion of less than $15 \times 10^{-7}$ °C.$^{-1}$ and, preferably, less than $0 \times 10^{-7}$ °C.$^{-1}$, measured between $-40°$ C. and $+80°$ C., to reduce the coefficient of thermal expansion of the composition. The fibers strengthen the composition. When utilized as a housing for intimate contact with optical waveguide couplers, this composition imparts resistance to bending or breakage by the coupler itself or the optical waveguide received by the coupler.

The composition of the present invention is not only useful for packaging optical waveguide couplers but also can be utilized in other packaging applications where low expansions and in situ fabrication are necessary.

DETAILED DESCRIPTION OF THE INVENTION

Figure 1:
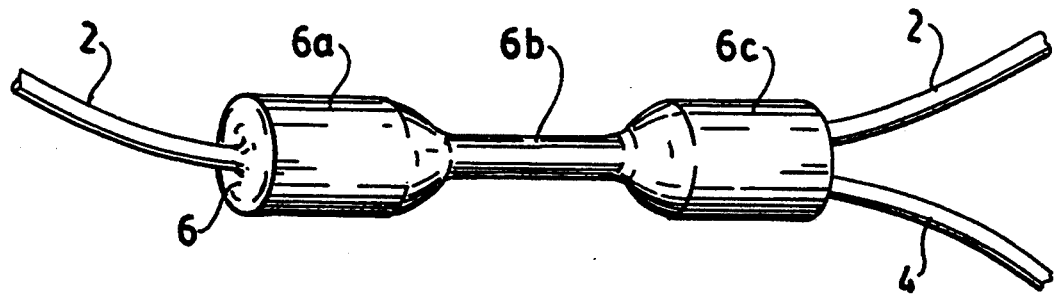
FIG. 1 is a perspective view of an optical waveguide coupler.

FIG. 1 is a perspective view of one type of optical waveguide coupler. In this device optical waveguide 2 extends into coupler 6, is coupled to waveguide 4, and both waveguides 2 and 4 exit from the coupler. Coupler 6 includes ends 6a and 6c which taper to a smaller diameter central region 6b.

Figure 2:
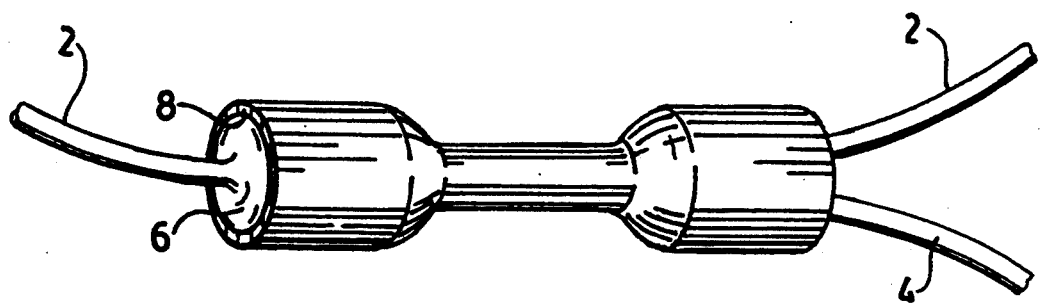
FIG. 2 is a perspective view of an optical waveguide coupler provided with a housing in accordance with the present invention.

FIG. 2 is a perspective view of an optical waveguide coupler provided with a housing in accordance with the present invention. Coupler 6 is in intimate contact with and strongly bonded to housing 8. Housing 8 can have a variety of configurations, such as a shape conforming to that of coupler 6 or a cylindrical tube which does not contact central region 6b. Alternatively, a coupler of the configuration disclosed by U.S. Pat. No. 4,943,130 to Dannoux et al. can also be packaged with a housing in accordance with the present invention.

Figure 3:
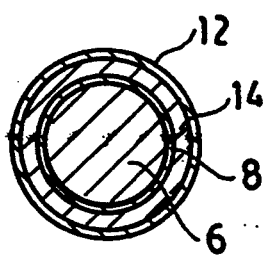
FIG. 3 is a cross-sectional view of a packaged coupler like that depicted in FIG. 2, but additionally provided with a surrounding shock absorbing material and an outer moisture barrier.

It is particularly desirable to surround housing 8 with moisture barrier 12. This is shown in FIG. 3 which is a side cross-sectional view of a packaged coupler like that depicted in FIG. 2 but additionally provided with a surrounding shock absorbing material 14 and an outer moisture barrier 12. The cross-sectional view of FIG. 3 can be taken anywhere along the length of coupler 6. Although housing 8 can be in direct and intimate contact with moisture barrier 12, it is advantageous to incorporate shock absorbing material 14 between housing 8 and moisture barrier 12. Although FIG. 3 shows moisture barrier 12 with a circular cross-section, it can alternatively have a square or rectangular cross-section.

Housing 8 is formed from a composition including a formable polymeric resin, a glass-ceramic or ceramic or glass filler, and, optionally, fibers. These materials are preferably blended in a composition of 10-50 weight percent polymeric resin, 1-60 weight percent filler, and 5-60 weight percent fibers. If fibers are not included, up to about 85 weight percent of filler can be utilized.

The filler may have a coefficient of thermal expansion less than $15 \times 10^{-7}$ °C.$^{-1}$, measured between $-40°$ C. and $+80°$ C., to reduce the coefficient of thermal expansion of the entire composition. Preferably, the coefficient of the filler is less than $0 \times 10^{-7}$ °C.$^{-1}$. It is particularly desirable to use a filler with a negative coefficient of thermal expansion. The fillers generally have an aspect (i.e., length to width) ratio of 1:1 to 3:1. One source of suitable fillers is the $\beta$-spodumene, $\beta$-quartz, or $\beta$-eucryptite phases of a $Li_2O.Al_2O_3.SiO_2$ system comprising 1-20 weight percent $Li_2O$, 5-25 weight percent $Al_2O_3$, and 25-85 weight percent $SiO_2$. This system can additionally contain ZnO, $ZrO_2$, $TiO_2$, other nucleating agents, and mixtures thereof. It has been found for such systems that a stuffed quartz blend of 3.5 weight percent $Li_2O$, 19.5 weight percent $Al_2O_3$, 73 weight percent $SiO_2$, and 4 weight percent ZnO has a coefficient of thermal expansion of $-12 \times 10^{-7}$ °C.$^{-1}$, measured between $-40°$ C. and $+80°$ C. A coefficient of thermal expansion of $-7 \times 10^{-7}$ °C.$^{-1}$, measured between $-40°$ C. and $+80°$ C., is achieved from a blend of 2 weight percent $Li_2O$, 18 weight percent $Al_2O_3$, 70 weight percent $SiO_2$, 10 weight percent ZnO, and 6 weight percent $ZrO_2$. A $\beta$-eucryptite composition of 15.56 weight percent $Li_2O$, 53.125 weight percent $Al_2O_3$, and 31.305 weight percent $LiO_2$ has a coefficient of thermal expansion of $-86 \times 10^{-7}$ °C.$^{-1}$, measured between $-40°$ C. and $+80°$ C. Finally, a blend of 75 weight percent $SiO_2$, 18 weight percent $Al_2O_3$, 4 weight percent $Li_2$, and 4 weight percent $ZrO_2$ achieves a coefficient of thermal expansion of $0 \times 10^{-7}$ °C.$^{-1}$, measured between $-40°$ C. and $+80°$ C.

Instead of a $LiO_2.Al_2O_3.SiO_2$ system, it is also possible to use a filler derived from an $Al_2O_3.TiO_2$ system comprising 40-60 weight percent $Al_2O_3$ and 40-60 weight percent $TiO_2$. For example, a composition of 56.06 weight percent $Al_2O_3$ and 43.9 weight percent $TiO_2$ has a coefficient of thermal expansion of $-19 \times 10^{-7}$ °C.$^{-1}$, measured between $-40°$ C. and $+80°$ C.

The polymeric resin utilized in the composition can be either a thermoplastic or thermosetting material, having a glass transition temperature of greater than 80° C., preferably above 100° C. The coefficient of thermal expansion of the formable polymeric resin is typically on the order of about 50 to $100 \times 10^{-6}$ °C.$^{-1}$. The coefficient of the housing composition with the filler and, optionally, the fibers added, should be less $30 \times 10^{-7}$ °C.$^{-1}$ preferably less than $10 \times 10^{-7}$ °C.$^{-1}$ in order to minimize thermal stresses due to a mismatch between the coefficient of the housing composition and that of the coupler itself, which is on the order of $5 \times 10^{-7}$ °C.$^{-1}$.

Thermosetting polymeric resins are particularly preferred. Such resins alone or dissolved in appropriate solvents should have a viscosity of up to 100 poise. Suitable thermosetting polymers include phenolic resins (having a coefficient of thermal expansion of $68 \times 10^{-6}$ °C.$^{-1}$), epoxy resins (having a coefficient of thermal expansion of $55 \times 10^{-6}$ °C.$^{-1}$), acrylics, epoxy novolacs (having a coefficient of thermal expansion of $50 \times 10^{-6}$ °C.$^{-1}$), and mixtures thereof.

Thermoplastic polymeric resins are less preferred because they have a high viscosity, even when melted, on the order of 1000 poise. Such polymers may be used in a solvent, with a solution viscosity of less than 100 poise. Suitable thermoplastic polymer resins include, for example, polyvinylidene chloride and other thermoplastic polymers with a glass transition temperature above 100° C.

The fibers, which are desirably utilized to strengthen the composition, can be continuous (i.e. extending substantially along the entire length of housing 8) or chopped (i.e. extending along only a part of the length of housing 8). Instead of individual fibers, fiber meshes may also be used. These fibers can be glass, graphite, aromatic polyamides (e.g., Kevlar ® Type A from E. I. DuPont de Nemours & Co., Wilmington, Del.), and mixtures thereof. These fibers generally have strengths in excess of 100,000 psi. The fibers should have an aspect (i.e. length to width) ratio of 50:1 to 2500:1, preferably 100:1 to 2500:1, with fiber lengths ranging from 0.64 to 5.80 cm.

It is particularly desirable to protect the optical waveguide coupler against moisture penetration by additionally providing moisture barrier 12 around housing 8. Such additional protection enables packaged couplers in accordance with the present invention to be used in potentially wet environments (e.g., transoceanic communication systems). This additional package can be made from a low expansion liquid crystal polymer, such as Vectra TM (Hoeschst-Celanese Corp., Summit, N.J.) or from a moisture barrier polymer like vinylidene chloride (e.g., Saran from Dow Chemical Co., Midland, Mich.) or even a metal foil moisture barrier.

To enhance the protective capability of housings provided with a second package, it is frequently desirable to incorporate a shock absorbing material 14 between moisture barrier 12 and housing 8. Examples of such shock absorbing materials include silicones, rubber, and mixtures thereof. These materials should have a glass transition temperature below 25° C., preferably below 0° C.

The optical waveguide coupler housing composition of the present invention is prepared by melting the glass-ceramic or ceramic or glass filler material at a temperature of 1500° to 1700° C. and then drigaging the melt. The melt is then cerammed and ground to an average particle size of 5 to 50 $\mu$m. The particulate filler is then blended with polymeric resin and water at about room temperature (i.e., 25° C.). To this slurry, fibers may be added.

The resulting blend can then be applied over an optical waveguide coupler. Once shaped and fitted around the coupler, the packaging composition is dried at 40° to 80° C. for 5 to 30 minutes to remove water and then cured at 125° to 150° C. for 10 to 90 minutes at atmospheric pressure.

The housing composition of the present invention can be applied in a variety of forms to couplers. In one embodiment, the composition is applied as a viscous paste. Alternatively, the composition can be formed as a tape which, when wetted (e.g., with water), can be adherently applied to a coupler, dried, and cured. The dimensions of the tape permit it to be wrapped substantially around the coupler without having overlapping portions. The tape can be applied manually or mechanically. For example, the tape can be applied by laying it between the coupler and a mesh screen and pushing the tape around the coupler with jaws which bond the tape to the coupler.

A rigid protective housing is thus formed in situ over the coupler so that the housing is in intimate contact with and bonded to the optical waveguide coupler. The rigid protective housing may be tightly bonded over the entire surface of the coupler as depicted in FIG. 2. Alternatively, it might be tightly bonded only at the thicker coupler ends to form a rigid cylinder solidified around the coupler with empty interior space adjacent the coupler central region 6c. In this alternative embodiment, the rigid protective housing may sag slightly around the central region of the coupler. The strengthening fibers in the housing preferably extend along linear paths parallel to the axis of the coupler. It may be alternatively possible to wrap the fibers individually or as mesh around the coupler provided the coupler has a diameter sufficient to permit the fibers to bend around the coupler periphery. The cured housing is strong and stiff with a Young's modulus of elasticity of at least $2 \times 10^6$ psi.

An outer moisture barrier, having a longitudinally-extending passage, is formed by injection molding the liquid crystal polymer. After the passage is filled with shock absorbing material, a coupler packaged in a protective housing 8 in accordance with the present invention can then be placed in the outer moisture barrier housing via its relatively large diameter passage. Other barrier polymers, such as polyvinylidene chloride, may be applied directly to the housing of packaged couplers through solution deposition or dipping after curing.

The composite package of the present invention allows the use of fragile couplers in various applications. The package results in highly reliable couplers with very low insertion losses. The strong, tough housing package of the present invention makes the couplers easy to handle during use, and their performance is not affected by temperature changes. As a result, such packaged couplers can be used in a wide variety of applications.

EXAMPLES

Example 1

A lithium alumino silicate glass with $Li_2O$ 4.87%, $Al_2O_3$ 16.6%, and $SiO_2$ 78.4% was melted in a platinum crucible at 1650° C. and drigaged. The resulting glass was clear, viscous and had some seeds. The glass was cerammed and then ground to a powder having an average particle size of 10 $\mu$m. Five grams of Phenolic Resin No. 43290 (Occidental Chemical Corporation, Niagara Falls, N.Y.) was mixed with 5.5 gms of water and to this 6.1 gm of the glass powder was added and mixed well. To the resulting slurry, 1.5 gm of chopped carbon fiber was added and mixed. The resulting mixture could be easily shaped. It was dried in an oven at 90° C. for 15 to 20 minutes to drive out water and then cured at 150° C. under slight pressure (i.e., less than 5 psig). The expansion of the mixture was measured at $26.9 \times 10^{-7}$° C. between $-40$° to $+80$° C.

Example 2

Another lithium alumino silicate composition with $Li_2O$ 4.4 weight %, $Al_2O_3$ 15.15 weight %, and $SiO_2$ 80.39 weight % was melted and treated in the same way as in Example 1. A composite with the same ratios of carbon fiber, filler powder, phenolic resin, etc. was made and its expansion was measured. The average thermal expansion of the composite was $5.2 \times 10^{-7}$° C. in the $-40$° C. to $+80$° C. range. This expansion is known to be in the right range for optical waveguide coupler packaging. Fiber and filler loading may be changed to obtain desired changes in expansion.

Examples 1 and 2 illustrate the use of glass-ceramic powders of different composition and different coefficients of expansion to control expansion of the composite material.

Example 3

Lithium alumino silicate glass composition of Example 2 ($Li_2O \cdot Al_2O_3 \cdot SiO_2$ in a ratio of 1:1:9), was melted in a platinum mixture at 1650° C. for 16 hours. The glass was then drigaged and cerammed at 1300° C. for 16 hours to crystallize it. The glass was then powdered to 200 mesh size. This glass powder was added to water-based Phenolic Resin No. 43290 (Occidental Chemical Corporation, Niagara Falls, N.Y.). Some distilled water was added to the resin to modify the viscosity. The weight ratio of the resin to glass to water was 5:9:4. Graphite fibers P55-S (Union Carbide Corporation) were cut to appropriate lengths and dipped in the slurry. The impregnated fiber tow was then manually wrapped around the coupler so that the tow tightly bonded to the coupler. The fibers were aligned along the length of the coupler. The composite was then cured by first removing water by drying at 75° to 95° C. and curing at 150° C. for 10 minutes. The preferred cure would not exceed 125° C. due to fiber coating and epoxy limitations. The coupler performance was optically measured. It was found that the packaging and curing process did not adversely affect the coupler performance. The packaged coupler was then thermally cycled from −40° to +85° C. The change in insertion loss in the packaged coupler remained very low at 0.05 dB through the cycle. This is indicative of a very optically stable device.

Example 4

Couplers were packaged as in Example 3 but with S-glass fiber (Owens-Corning Fiberglass Corporation). This fiber has a substantially higher expansion coefficient of $1.8 \times 10^{-6}$° C., measured according to ASTM standard No. D-696, compared to graphite fiber which has a coefficient of $-1.2 \times 10^{-6}$°/C., measured according to ASTM Standard No. D-696, axially and $18.6 \times 10^{-6}$°/C., measured according to ASTM Standard No. D-696, laterally. For glass fibers, expansion is isotropic compared to the anisotropic thermal expansion of the graphite fiber. The packaged couplers showed insertion loss of only 0.05 to 0.07 dB, through thermal cycling between −40° to +85° C. The losses are very low compared to the industry standard of 0.3 dB allowable loss. This example shows that a high expansion fiber may be used in the composite for reinforcement.

Example 5

A coupler was packaged as in Example 3 but with Kevlar ® 49 aramid fibers (E. I. DuPont de Nemours & Co., Wilmington, Del.). The fiber has an axial expansion of $-4.8 \times 10^{-6}$° C., measured according to ASTM Standard No. D-696, and a radial expansion of $46 \times 10^{-6}$° C., measured according to ASTM Standard No. D-696. The coupler again passed thermal cycling with an insertion loss of 0.17 dB. This example illustrates the use of an organic fiber for reinforcement.

Example 6

The experiment of Example 3 was repeated with glass powder and graphite fiber but with an epoxy resin DER 332 (Dow Chemical Co., Midland, Mich.). The resin was cured with coupling agent DEH24 (Dow Chemical Co., Midland, Mich.), in a respective ratio of 1:0.13 and diluted with acetone. The glass and graphite fiber was then mixed with the resin and the mixture wrapped around the coupler as before. The resin was cured at 100° C. for 3 hours after drying overnight at room temperature. The wrapped coupler showed an insertion loss of 0.10 dB.

Thus, various fiber-resin combinations may be used to package the couplers with addition of the glass-ceramic powder.

Example 7

A coupler was packaged as described in Example 3 and a second injection molded package fabricated from Vectra TM liquid crystal polymer from (Hoeschst-Celanese Corp., Summit, N.J.) was mounted around the composite package. The coupler rested in a low modulus 6186 SILCONE (General Electric, Co., Waterford, N.Y.), and was held in place by gluing the fibers to loose tubes which serve to protect the acrylate coated fibers. The polymer package, consisting of two parts, was sealed together by ultrasonic welding with any remaining openings around the existing fibers sealed with a U.V. curable adhesive (Hernon Manufacturing, Sanford, Fla.). The performance of the packaged, reinforced coupler was again measured through thermal cycling between −40° and +85° C. The losses through this test remained below 0.08 dB. The packaged couplers thus significantly exceeded the industry proposed specification of 0.30 dB.

Although the invention has been described in detail for the purpose of illustration, it should be understood that such detail is solely for that purpose, and variations can be made therein by those skilled in the art without departing from the spirit and scope of the invention which is defined by the following claims.

What is claimed:

1. An optical fiber coupler packaged for resistance to bending or breakage comprising:
   an elongate coupler body comprising at least one waveguide path formed in one or more glass structures and
   a rigid housing intimately contacting at least a portion of said coupler body wherein said housing is strongly and stiffly bonded to said coupler body,
   wherein said housing is formed from a composition comprising:
      a thermosetting polymeric resin;
      a glass-ceramic or ceramic or glass filler with a coefficient of thermal expansion of $15 \times 10^{-7}$° $C.^{-1}$ or less, measured between −40°0 C. and +80° C., to reduce the coefficient of thermal expansion of said composition; and
      fibers to strengthen the composition and the housing, wherein said composition has a coefficient of thermal expansion of less than $30 \times 10^{-7}$° $C.^{-1}$, measured between −40° C. and +80° C.

2. A packaged coupler according to claim 1, wherein said filler is derived from β-spodumene, β-quartz, or β-eucryptite phases of a $LiO_2 \cdot Al_2O_3 \cdot SiO_2$ system comprising 1–20 weight percent $Li_2O$, 5–25 weight percent $Al_2O_3$, and 25–85 weight percent $SiO_2$.

3. A packaged coupler according to claim 1, wherein said filler is derived from an $Al_2O_3 \cdot TiO_2$ system comprising 40–60 weight percent $Al_2O_3$ and 40–60 weight percent $TiO_2$.

4. A packaged coupler according to claim 1 further comprising:
   an outer moisture barrier around said housing.

5. A packaged coupler according to claim 4 further comprising:
a viscous shock absorbing material between said outer moisture barrier and said housing to dampen vibrations.

6. A packaged coupler according to claim 5, wherein said viscous shock absorbing material is selected from the group consisting of silicones, rubber, and mixtures thereof and wherein said outer moisture barrier comprises a liquid crystal polymer.

7. A packaged coupler according to claim 1, wherein said coupler has a longitudinal axis and said fibers extend along a path substantially parallel to the longitudinal axis of said coupler.

8. A packaged coupler according to claim 1, wherein said fibers are continuous.

9. A packaged coupler according to claim 1, wherein said fibers are substantially continuous.

10. A packaged coupler according to claim 1, wherein said fibers are selected from the group consisting of glass, graphite, aromatic polyamides, and mixtures thereof.

11. A packaged coupler according to claim 1, wherein said composition has a coefficient of thermal expansion of less than $10 \times 10^{-7}$ C.$^{-1}$, measured between $-40°$ C. and $+80°$ C.

12. A packaged coupler according to claim 1, wherein said filler has a negative coefficient of thermal expansion.

13. A packaged coupler according to claim 1, wherein said thermosetting polymeric material is selected from the group consisting of phenolic resins, epoxy resins, acrylate resins, and mixtures thereof.

14. A packaged coupler according to claim 1, wherein said composition comprises 10–50 weight percent of said thermosetting polymeric resin, 1–60 weight percent of said filler, and 5–60 weight percent of said fibers.

15. A process of packaging an optical element comprising:
providing a housing composition comprising:
a thermosetting polymeric resin;
a glass-ceramic or ceramic or glass filler with a coefficient of thermal expansion of less than $15 \times 10^{-7}$ C.$^{-1}$, measured between $-40°$ and $+80°$ C.; and
fibers to strengthen the composition and the housing, wherein said composition has a coefficient of thermal expansion of less than $30 \times 10^{-7}$ C.$^{-1}$, measured between $-40°$ C. and $+80°$ C.;
applying said composition to an optical element; and
curing said composition to form a stiff, strong housing intimately contacting and bonded to said optical element.

16. A process according to claim 15, wherein said optical element has a longitudinal axis and said fibers extend continuously or substantially continuously along a path substantially parallel to the longitudinal axis of said optical element.

17. A process according to claim 15, wherein said optical element is an optical coupler.

18. A process according to claim 17, wherein said housing composition is in the form of a tape which can be wetted to adhere to the optical coupler.

19. A process according to claim 18, wherein the tape is wrapped substantially around the optical coupler without having overlapping portions.

* * * * *